United States Patent [19]

Hügenell

[11] Patent Number: 5,367,407
[45] Date of Patent: Nov. 22, 1994

[54] APPARATUS FOR SUPPORTING AN AIMING AND ORIENTING APPLIANCE USEFUL IN REFLECTOR SYSTEMS

[75] Inventor: Hermann Hügenell, Lambsheim, Germany

[73] Assignees: Karl Friedrich Angstenberger; Hermann Hugenell, Germany; a part interest

[21] Appl. No.: 916,980
[22] PCT Filed: Dec. 10, 1991
[86] PCT No.: PCT/CH91/00259
§ 371 Date: Sep. 24, 1992
§ 102(e) Date: Sep. 24, 1992
[87] PCT Pub. No.: WO92/10775
PCT Pub. Date: Jun. 25, 1992

[30] Foreign Application Priority Data

Dec. 13, 1990 [DE] Germany ............... 4039880

[51] Int. Cl.⁵ .................. G02B 7/00; G02B 23/00
[52] U.S. Cl. .................. 359/876; 359/872
[58] Field of Search .......... 359/555, 556, 876, 202, 359/877, 872

[56] References Cited

U.S. PATENT DOCUMENTS

| | | |
|---|---|---|
| 2,968,228 | 1/1961 | Merritt ............... 359/555 |
| 3,791,713 | 2/1974 | Mackay. |
| 3,951,510 | 4/1976 | Lloyd ............... 359/555 X |
| 4,300,160 | 11/1981 | Pusch et al. ............... 359/876 X |
| 4,822,156 | 4/1989 | Hugenell. |
| 4,828,376 | 5/1989 | Padera ............... 359/555 X |
| 4,991,948 | 2/1991 | Hugenell. |
| 5,204,785 | 4/1993 | Tang et al. ............... 359/876 |

FOREIGN PATENT DOCUMENTS

| | | |
|---|---|---|
| 3538208 | 5/1987 | Germany. |
| 3707642 | 3/1988 | Germany. |
| 1136054 | 12/1968 | United Kingdom ............... 359/555 |
| 1188578 | 4/1970 | United Kingdom. |

Primary Examiner—Edward K. Look
Assistant Examiner—Hoang Nguyen
Attorney, Agent, or Firm—Bell Seltzer Park

[57] ABSTRACT

A double reflector system is described which comprises two spaced apart primary mirrors oriented toward a common focus. The optical system further comprises two separate secondary deflector mirrors as well as tertiary deflector mirrors for beam concentration on a common focus. The optical system is housed in an elongate casing having coaxial bearing support cylinders at its opposite ends which define an axis of elevation, and the casing is hydrostatically supported in part on a circular tray which is in turn hydrostatically and rotatably supported upon a stationary bed. A support ring is disposed concentrically about the tray, and the support ring includes bushings which receive the bearing cylinders of the casing and thus also support in part the weight of the casing. The support ring and the tray are independently rotatable in a horizontal plane, and the casing is rotatable by a separate drive about the axis of elevation.

11 Claims, 8 Drawing Sheets

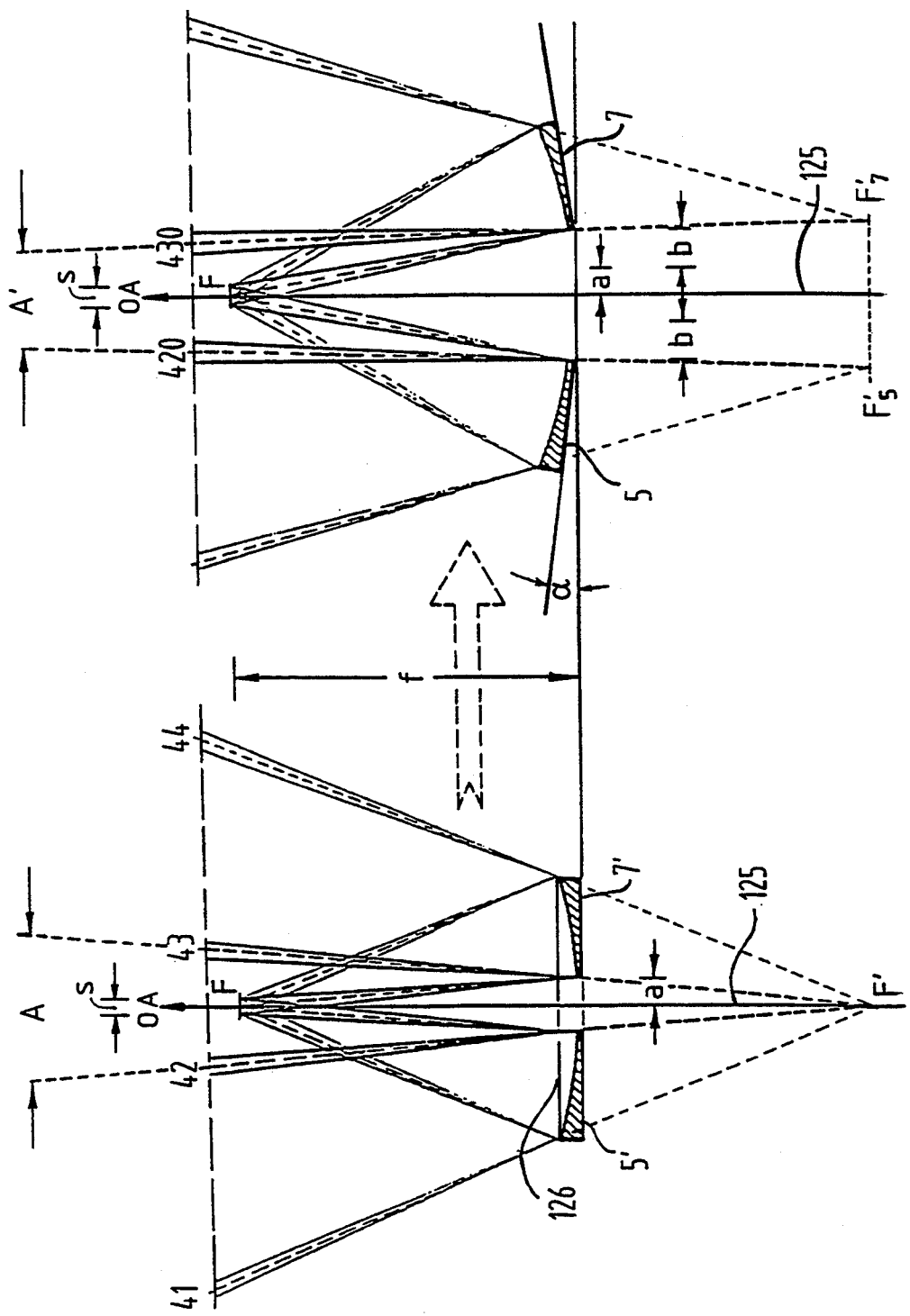

APPARATUS FOR SUPPORTING AN AIMING AND ORIENTING APPLIANCE USEFUL IN REFLECTOR SYSTEMS

BACKGROUND OF THE INVENTION

The invention relates to a reflector supporting apparatus for an astronomical instrument, and more particularly to an apparatus for supporting an aiming and orienting appliance useful in reflector systems.

A reflector supporting device is known from the publication SPIE, vol. 1236, Advanced Technology Optical Telescopes IV (1990) page 86 et seq. In this apparatus two rotationally symmetrical primary mirrors are arranged, as an astronomical instrument, on a common support member at a predetermined spacing. The reflected rays are brought to a common focus by means of deflector mirrors. Multiple reflector mirrors and a protective casing likewise are located on the support member.

The total mass of the support member, the mirrors and the superstructures rests on two pivot bearings of a rotary table which is movable in the horizontal plane. As the pivot bearings are loaded with the full weight of the system, there is a risk that negative effects will occur on the formation of the image, by reason of the inherent vibration and frequency of the optical and mechanical devices during a tilting movement, and which can be restricted only by costly and technically difficult counter measures. In view of the fact that increasing primary mirror diameters, and the additional auxiliary equipment this involves, result in an enormous increase in mass, it is difficult to provide pivot bearings which can accommodate these masses, while observing the required parameters. Accordingly, the known supporting apparatus is little suited for large telescopes in particular, and also for reflector systems having diameters of more than 8 meters, when used in different manner.

Another supporting apparatus of the described type is described in WO 88/06743 by Huegenell. The support member for a reflector telescope in this case is supported hydrostatically by a large bearing surface in a stationary tray, which is adapted to the spherical shape of the support member, so as to be pivotable about the axis of elevation. At two diametrically opposed ends and coaxial with the axis of elevation, the support member includes circular cylinders which are each arranged for rotation in a bushing. The bushings are located in a ring which is disposed concentrically with the tray and is rotatable about the axis of elevation and which also includes a drive.

It is an object of the present invention to provide a supporting apparatus of the kind specified, and wherein the reflectors and deflector mirrors, as well as evaluating means cooperating with them, and which have especially great diameters and masses, can be supported reliably, with non-vignetted image formation, when used as an astronomical instrument, and which also has an undisturbed radiation path at the receiving end and also in the radiation direction.

SUMMARY OF THE INVENTION

The above and other objects and advantages of the present invention are achieved by the provision of a supporting apparatus which comprises an elongate casing adapted for supporting the reflectors of an astronomical instrument or the like, with the casing having opposite ends and a pair of coaxial support cylinders positioned at respective ones of the ends and so as to define an axis of elevation. A circular tray supports the casing hydrostatically thereupon for rotation about the axis of elevation, and means are provided for mounting the tray hydrostatically upon a stationary bed and such that the tray is rotatable in a horizontal plane. A support ring is disposed concentrically about the tray, with the support ring having a pair of bushings rotatably supporting respective ones of the pair of support cylinders of the casing. Also, means are provided for supporting the support ring hydrostatically for independent rotation in said horizontal plane, and drive means is provided for rotating the tray and the support ring in the horizontal plane.

In the preferred embodiment the drive means comprises first drive means for rotating the tray, and second drive means for rotating the support ring, and means electronically coupling the first and second drive means such that the movement of the ring serves as a reference for controlling the angular velocity of the tray.

One important feature of the present invention is to distribute the weight of the support casing to two separate components, with one component dissipating the main mass. In this manner, the second component is mechanically relieved and, therefore, can be controlled with high precision. Rotational movement consequently takes place, starting from the unloaded pivot bushings in the area of the axis of elevation, with the bearing tray which carries the main mass following.

Another important feature of the present invention resides in the fact that the support casing which houses the two reflectors, includes an annular shell disposed coaxially with the axis of elevation and which serves as a rotational guide and mechanical stiffener, and that the shell is guided in a conforming channel formed as a counter-guide in the tray. This provides the advantage that precise low-friction guidance of the support casing, accommodating large-area forces, is given with a so-called altazimuthal follow-up. In addition, the shell also serves for stabilizing the rotation of the support casing.

It is particularly convenient to also provide a rotary drive unit which acts on the shell and is positioned in the area in which the support casing passes into its hydrostatic support in the tray. Preferably, the rotary drive unit comprises two coaxial drive wheels which cooperate with predetermined annular gears on the shell.

To make sure that mechanical disturbances are not mutually transmitted upon rotation of the shell and the ring but instead are precisely controllable without any undesirable mutual influence, a preferred further development of the invention resides in that the bed, which supports the tray, and the ring, which carries the pivot bushings, are separated from each other by an annular concrete shell.

Another feature of the invention resides in that the support casing takes the form of a closed, substantially self-supporting, bobbin-shaped casing which is provided with two juxtaposed apertures for radiation entry into the interior onto the two reflectors or for reception or irradiation of high-energy radiation.

As a weather protection means, it is additionally provided, according to another advantageous embodiment of the invention, that the entire reflector supporting apparatus, including the support casing, the tray, and the ring are covered by a dome structure formed as a flat spherical segment, that the dome structure is supported hydrostatically in a stationary concrete ring for rotation in the horizontal plane, and that the concrete ring is separated from the rest of the stationary foundation by strong, hard rubber-elastic buffers.

An especially convenient guidance of the dome structure is achieved by virtue of its being rotatably arranged in the front end of the concrete wall by way of a bearing base and by the stationary bearing being transferable hydraulically or pneumatically into a sliding bearing.

BRIEF DESCRIPTION OF THE DRAWINGS

The invention will be described in greater detail below with reference to a preferred embodiment as illustrated in the drawings, wherein FIG. 1 diagrammatically shows a vertical cross section of a reflector support apparatus of a mirror telescope;

FIGS. 3 and 4 each show diagrammatically a cross section of the reflectors and the reflector support system according to FIGS. 1 and 2 with different reflector arrangements;

DETAILED DESCRIPTION OF THE PREFERRED EMBODIMENT

Figure 1:
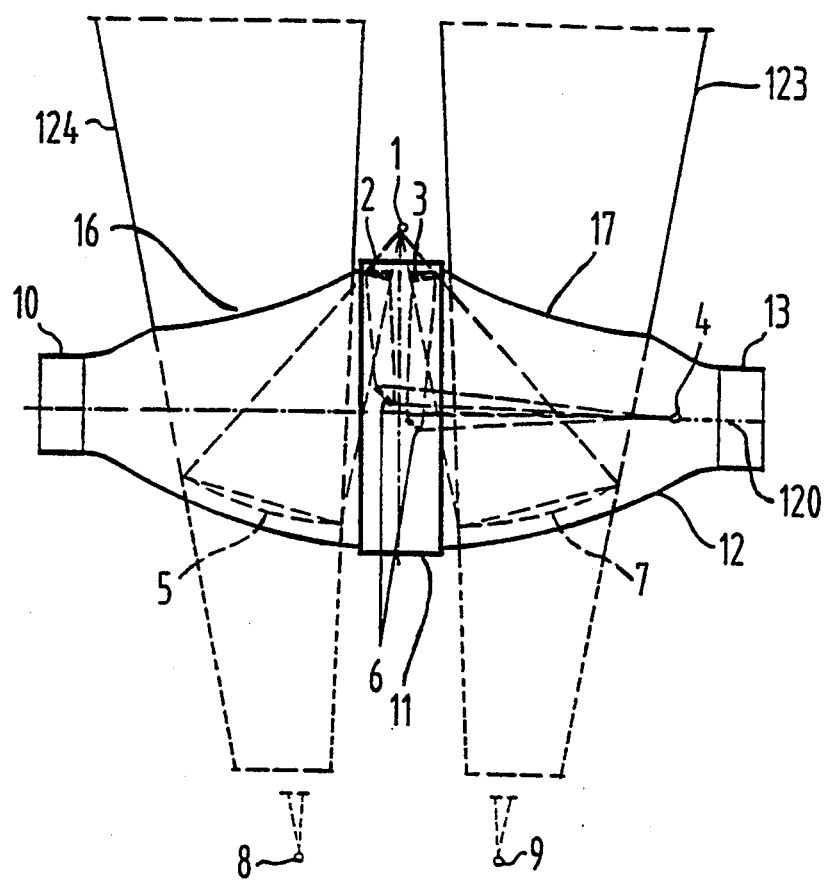

FIG. 1 illustrates a reflector support casing 12 for use as a mirror telescope, comprising two primary mirrors of primary reflectors 5 and 7. It is a so-called big telescope, with each reflector 5, 7 having a diameter of more than 8 m. Optimum adaptation to the known diffraction effect of the atmosphere surrounding the earth is obtained with aperture diameters of about 15 m.

The reflector support casing 12 is supported for rotation about the axis of elevation 120, on the one hand, and on the other hand within a horizontal plane which extends perpendicular to the plane of the drawing. For purposes of clarity of presentation, FIG. 1 does not represent the stationary support structure on which the reflector support casing rests, the support structure being described in detail in FIGS. 8 to 11.

The reflector support casing 12 comprises a closed, substantially self-supporting, elongate, bobbin-shaped member which is provided with two side-by-side apertures 16, 17 for radiation entry/exit into the interior on the two reflectors 5, 7. Moreover, the reflector support casing 12 comprises a circular cylinder 10, 13 each at its ends, concentrically with the axis of elevation 120, the outer jacket of each of them serving for low-friction bearing support in the rotational movement about the axis of elevation 120 and access into the casing being permitted through the interior of each of them. An annular shell 11, which is disposed coaxially with the axis of elevation 120 and at a medial location along the length of the casing, serves for guidance and as a carrier frame.

In addition to the two reflectors 5, 7, a mirror telescope used as an optical instrument comprises two separate secondary deflector mirrors 2, 3 as well as two separate tertiary deflector mirrors 6 arranged in such a way that the radiation of both reflectors 5, 7 is concentrated in a common Nasmith focus 4 on the axis of elevation 120.

Figure 7:
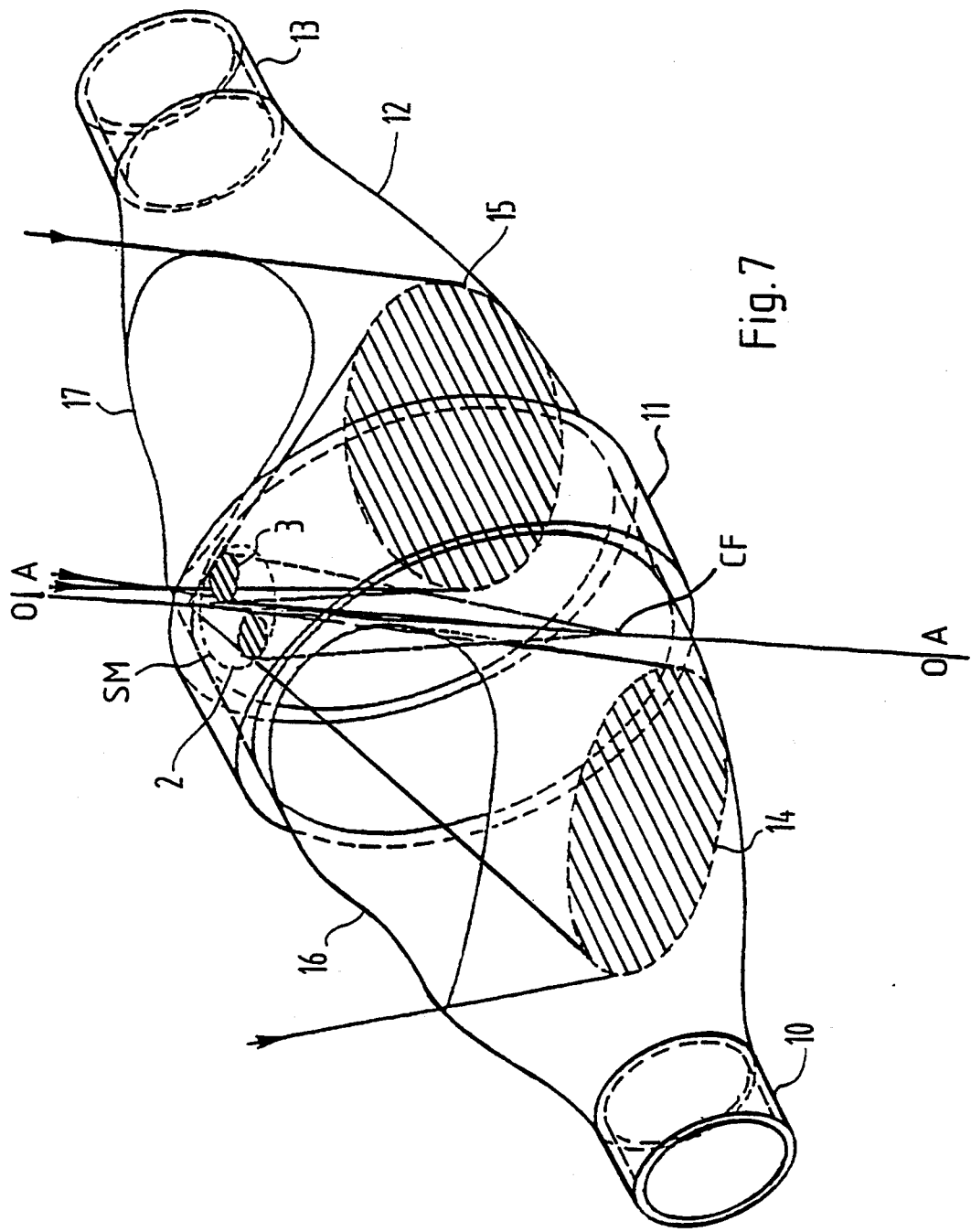
FIG. 7 shows a perspective illustration, partly in section, of the reflector support apparatus according to FIGS. 1 and 2.

The two reflectors 5, 7 and the respective associated secondary deflector mirrors 2, 3 are so-called off-axis mirrors, i.e. their surfaces represent surface sectors of a hypothetical, big, aspherical mirror body 126 (FIG. 3); SM (FIG. 7). The region of the incident radiation is marked 123 and 124, respectively, and the virtual foci as well as the primary focus are marked by reference numerals 8, 9, and 1 respectively. In contrast to the secondary deflector mirrors 2, 3, the two tertiary deflector mirrors 6 are of planar design.

Figure 2:
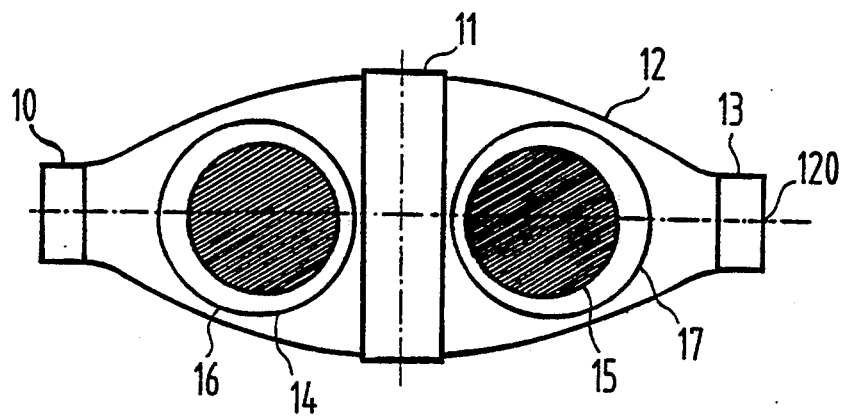
FIG. 2 diagrammatically shows a top plan view of the reflector support system according to FIG. 1.

The area 14, 15 of reflection for the reflectors 5, 7, each illustrated by hatching, may be taken from the top plan view of FIG. 2 taken in the direction of incident light.

Further details of the optical means will be explained below with reference to FIGS. 3 and 4. The presentation according to FIG. 3 merely serves to explain the final situation of the reflectors 5, 7 in the reflector support casing 12 demonstrated in FIG. 4. In other words, FIG. 3 is merely a presentation of an intermediate consideration which is convenient for the final concept.

In accordance with this mental step in between, the two reflectors 5', 7' each are spaced by a predetermined distance a from the common optical axis (OA) at their edges facing each other. Marked by 126, FIG. 3 further shows the hypothetical, aspherical, rotationally symmetrical reflector out of which the two reflectors 5', 7' are "cut" offset by the distance a from the optical axis 125. The hypothetical focus of the hypothetical, aspherical, rotationally symmetrical reflector 126 is marked F', while its outer marginal rays which illustrate a great aperture ratio are marked 41 and 44, respectively, (in this case with a hyperbolic mirror). They coincide with the outer marginal rays at the outer edges which are remote from each other of the reflectors 5', 7'. The inner marginal rays which are incident at the edges facing each other of the reflectors 5', 7' are marked 42 and 43, respectively. They define a dead zone A which results from the arrangement in pairs of the two reflectors 5', 7', maintaining a spacing in between The image plane (focus) F of the hypothetical big mirror (hyperbolic mirror) also is the common image plane of the two reflectors 5', 7', necessitated by the system. f indicates the focal length of the hypothetical big mirror or mirror combination of the two reflectors 5', 7'. The image plane F includes a raster dimension s. When a different surface shape is used for the big mirror 126, the beam paths vary analogously.

The basic curves of the two reflectors 5', 7' are absolutely identical since they are "cut out" of the hypothetical big mirror 126 at the same diameter and the same spacing a from the optical axis thereof. To obtain big-area reflectors, in practice the reflectors 5', 7' are composed of individual segments (cf. FIG. 7) each being individually adjustable. For ground-based systems, the segments may be made of quartz. Their support structure comprises cavities through which a cooling gas may be flooded to keep the temperature intentionally constant, with an exchange of coolant being possible through bores.

As compared to their original hypothetical position in the hypothetical big mirror 126 when using a hyperbolically shaped big mirror 126, the reflectors 5, 7 are arranged at a spacing b from the optical axis 125 which is greater than the optical spacing a in order to achieve the final position illustrated in FIG. 4. Moreover, the two reflectors 5, 7 are inclined symmetrically with respect to the optical axis 125, each by an angle $\alpha$, such that those marginal rays 420 and 430, respectively, which are closest to the optical axis 125 intersect on the axis at a distance which is greater than the focal length f of the hypothetical reflector 126. In this manner the dead zone A' of observation is eliminated. The inclination of the reflectors 5, 7 by angle $\alpha$ with respect to the optical axis 125 is omitted when big mirror surfaces having other configurations are used. Besides, the superpositioning of the rays reflected by the two primary mirrors 5, 7 results in object imaging in the focal plane effected from different angles, thus permitting an interference image of this object within an optimum image raster dimension. For example, a total light intensity of an equivalent, one-piece primary mirror whose diameter is 21, 21 m is achieved with a diameter of 15 m for each of the two reflectors 5, 7.

In FIG. 4 the hypothetical foci of the two off-axis hyperbolic reflectors 5, 7 are marked F'5 and F'7, respectively. Also the two secondary deflector mirrors 2, 3 originate from a common hypothetical mirror SM (FIG. 7) which would be needed to reflect light reflected by the hypothetical big mirror 126 to the so-called Cassegrain or Nasmith focus (or other further common foci), mutatis mutandis in the same way in which these reflectors 5, 7 are derived from the hypothetical big mirror 126. The two secondary deflector mirrors 2, 3 accordingly consist of partial areas of a convexly curved hypothetical mirror surface which are spaced from the optical axis thereof and dimensioned such that they generate the reflection rays of the reflectors 5, 7 by way of the tertiary mirrors 6 the desired focus 4 (FIG. 1) or directly a Cassegrain focus CF on the optical axis 125 (FIG. 5).

Figure 5:
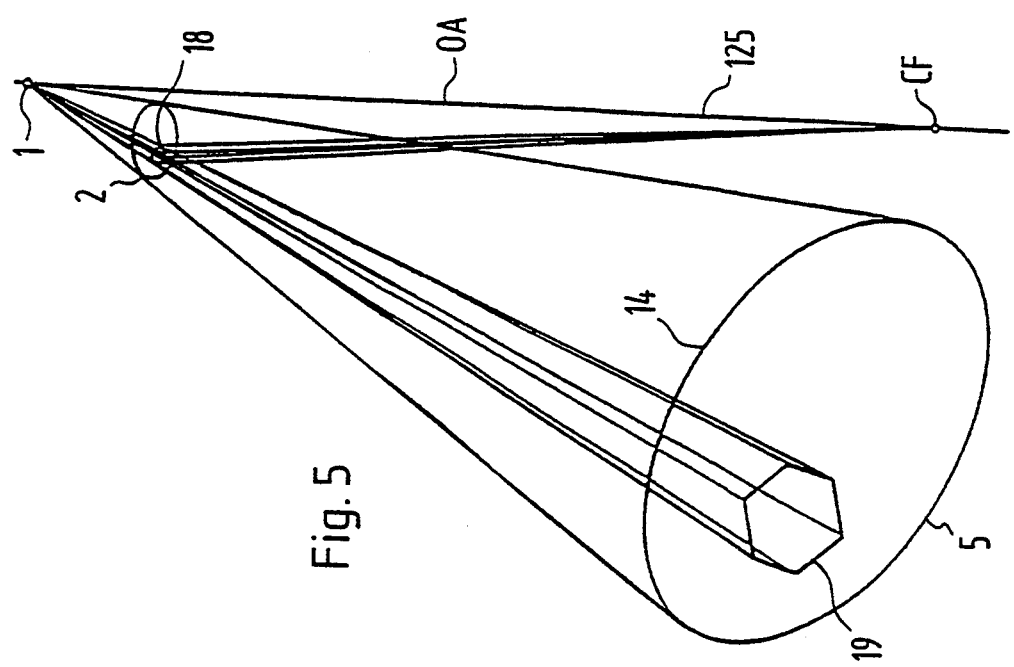

Based on the example of a primary reflector 5, FIG. 5 further illustrates that not only the two primary mirrors are composed of separately controllable and adjustable honeycomb segments 19 but also the secondary deflector mirrors 2 and 3, respectively, with an adaptation of the dimensional relationships. To keep the presentation clear, FIG. 5 illustrates only one segment 19 and 18 each in the primary mirror 5 and the secondary mirror 2, respectively.

Figure 6:
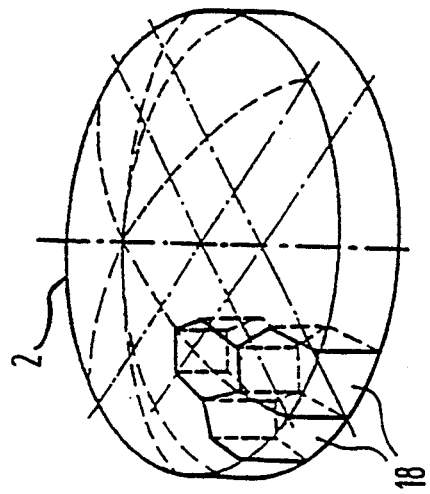
FIGS. 5 and 6 each diagrammatically show details of the reflector arrangement according to FIG. 4.

FIG. 6 shows in addition the manner in which an uninterrupted reflector surface is obtained by lining up honeycomb segments 18. The precise alignment with the respective focus is effected by means of computer controlled actuators.

FIG. 7 illustrates, in a perspective presentation, how a reflector arrangement according to FIG. 5 is supplemented to form an arrangement in pairs and inside the mirror support casing 12. The hypothetical reflector from which the two secondary deflector mirrors 2, 3 are derived is entered in the drawing, marked SM, to supplement the above explanations.

The figures to be described below essentially relate to the rotatable supporting of the reflector support casing 12.

Figure 8:
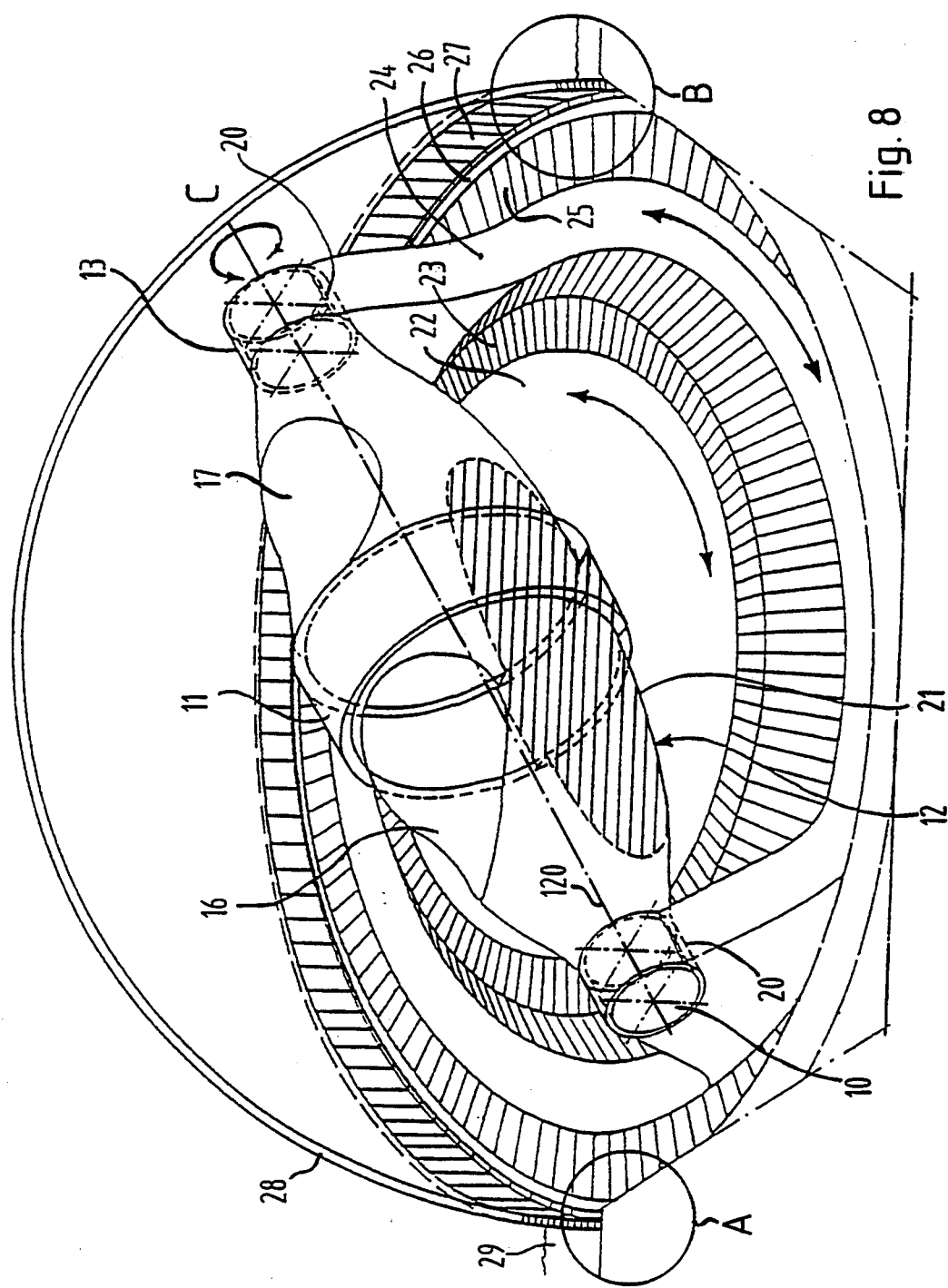
FIG. 8 diagrammatically shows an overall view of a mirror telescope, partly in perspective and partly in section.

According to FIG. 8 the elongate bobbin-shaped casing of the reflector support system is supported on a liquid film in a tight circular tray 22. The actual liquid bearing area is marked 21. The tray 22 itself is supported hydrostatically in a concrete bed for rotation in the horizontal plane and is surrounded by a stationary annular concrete shell 23. Together with an outer concrete ring 25 the latter forms a foundation and a concentric guide means for a rotatably supported ring 24 provided with two bushings 20 for the circular cylinders 10, 13 of the reflector support casing 12. Both the ring 24 and the tray 22 each are independently supported hydrostatically so that the effect of their inherent masses becomes negligible. Furthermore, the ring 24 and the tray 22 each are acted upon by a drive by means of which they can be set into rotating motion in the horizontal plane. Both drives are coupled electronically in such manner that the ring 24 serves as master or reference for the tray 22 to control the angular velocity during common rotation of the reflector support casing 12 about the axis of elevation.

The concrete shell 23 makes sure that the rotational drive forces for the ring 24 and the tray 22 do not disturb each other but instead are precisely controllable without any undesirable mutual influence.

With these two separate and electronically coupled bearing and drive systems the tray 22 takes over the main burden of the reflector support casing 12. The bushings 20 for the circular cylinders 10, 13 are relieved by comparison. They thus permit precise control of the so-called altazimuthal following in the sky. The annular shell 11 of the reflector support casing 12 is provided with another drive means 30 (FIG. 9) for movement about the axis of elevation 120. The shell 11 at the same time serves to stabilize the rotation of the reflector support casing 12. The rotary drive unit 30 is positioned where the casing 12 passes into its hydrostatic bearing channel in the tray 22.

Figure 9:
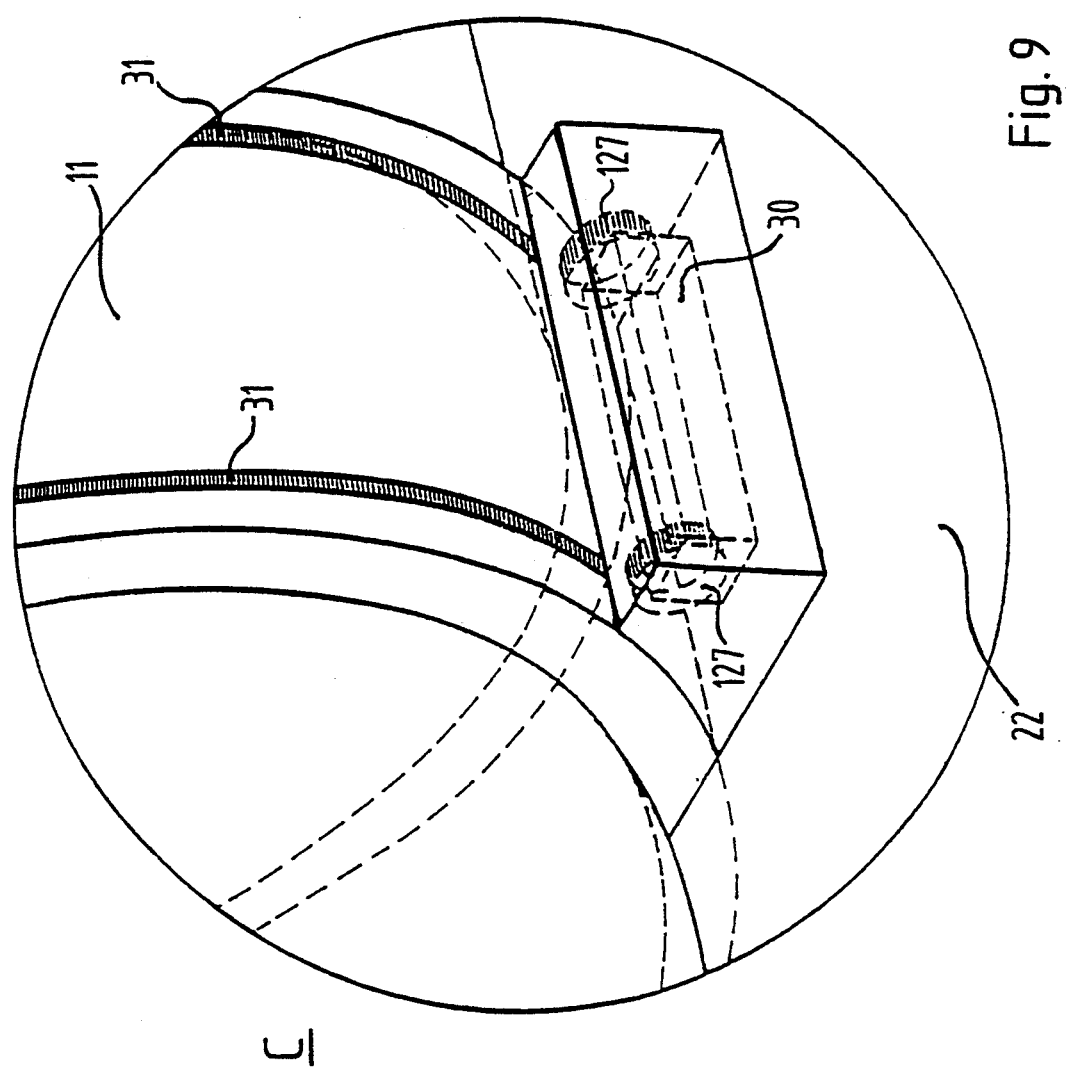
FIGS. 9 to 11 each show details A, B, and C of the bearing arrangement according to FIG. 8.

As illustrated in FIG. 9, the rotary drive unit 30 comprises two coaxial drive wheels 127, such as gears, which cooperate with corresponding counterparts or annular gears 31 on the annular shell 11.

FIG. 8 further illustrates that the entire reflector support casing 12, the tray 22, and the ring 24, together with the concrete shell 23 and the concrete ring 25, are covered by a dome structure or protective cupola 28 for weather protection. The dome structure 28 is designed as a flat spherical segment and positioned concentrically above the whole assembly. It is adapted to be closed selectively, without leaving any gaps, in the area of slit-like openings (not shown) which are required for the incidence of light, by use of a single closing mechanism, from the zenith position of the telescope down to the lowest angular positioning of the optical apertures towards the horizon. The openings are designed to be slit-like so that a shell surface belonging to the spherical segment extends between these openings. In this manner the closing mechanism is stabilized because the spanning closure width provides firm support precisely in the middle and along the closure path. The dome structure 28 is hydrostatically supported in a stationary concrete wall 27 for rotation in the horizontal plane. The mass of the dome structure 28 is taken down into the ground through the annular concrete wall 27.

Figure 10:
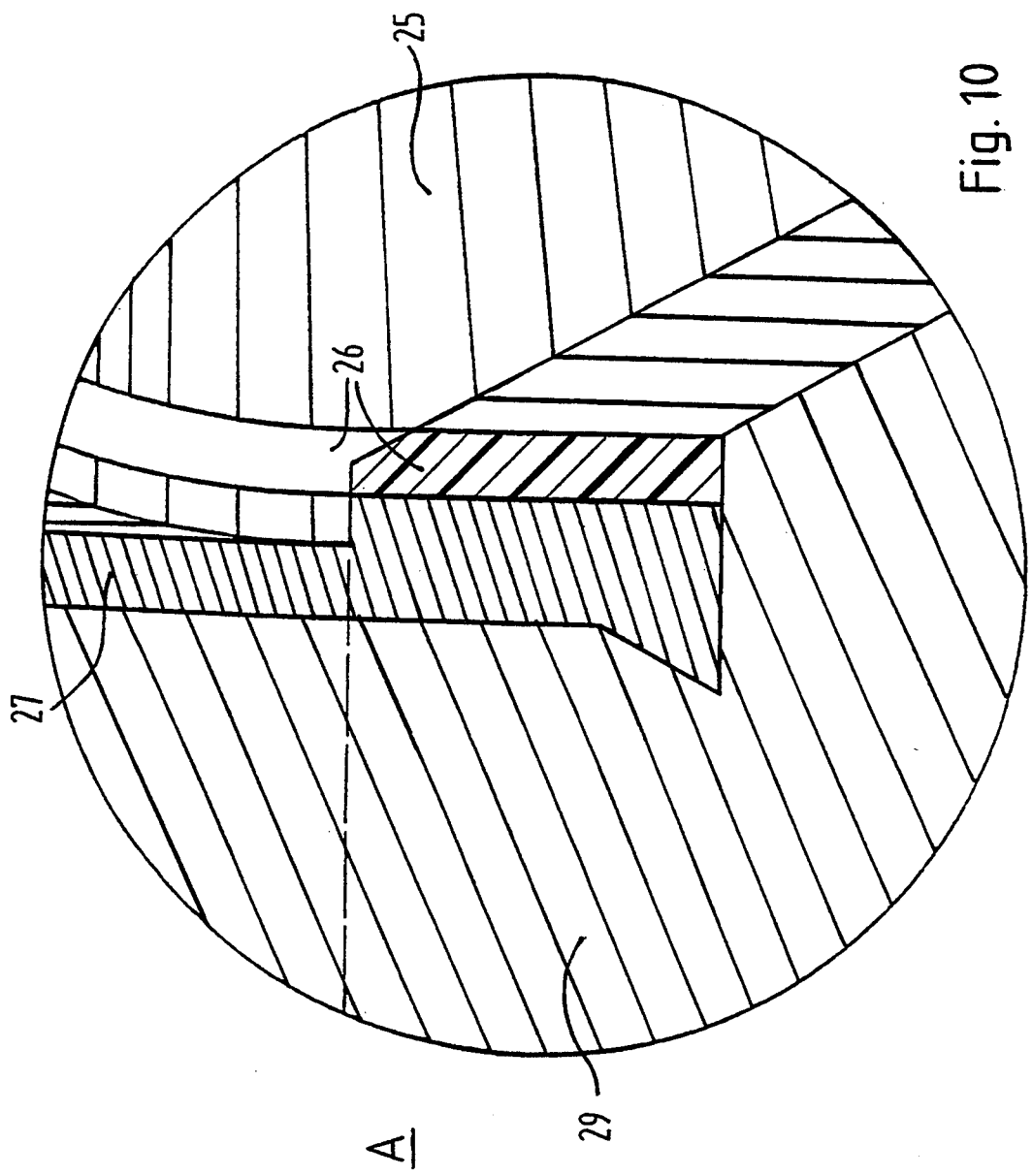
Figure 11:
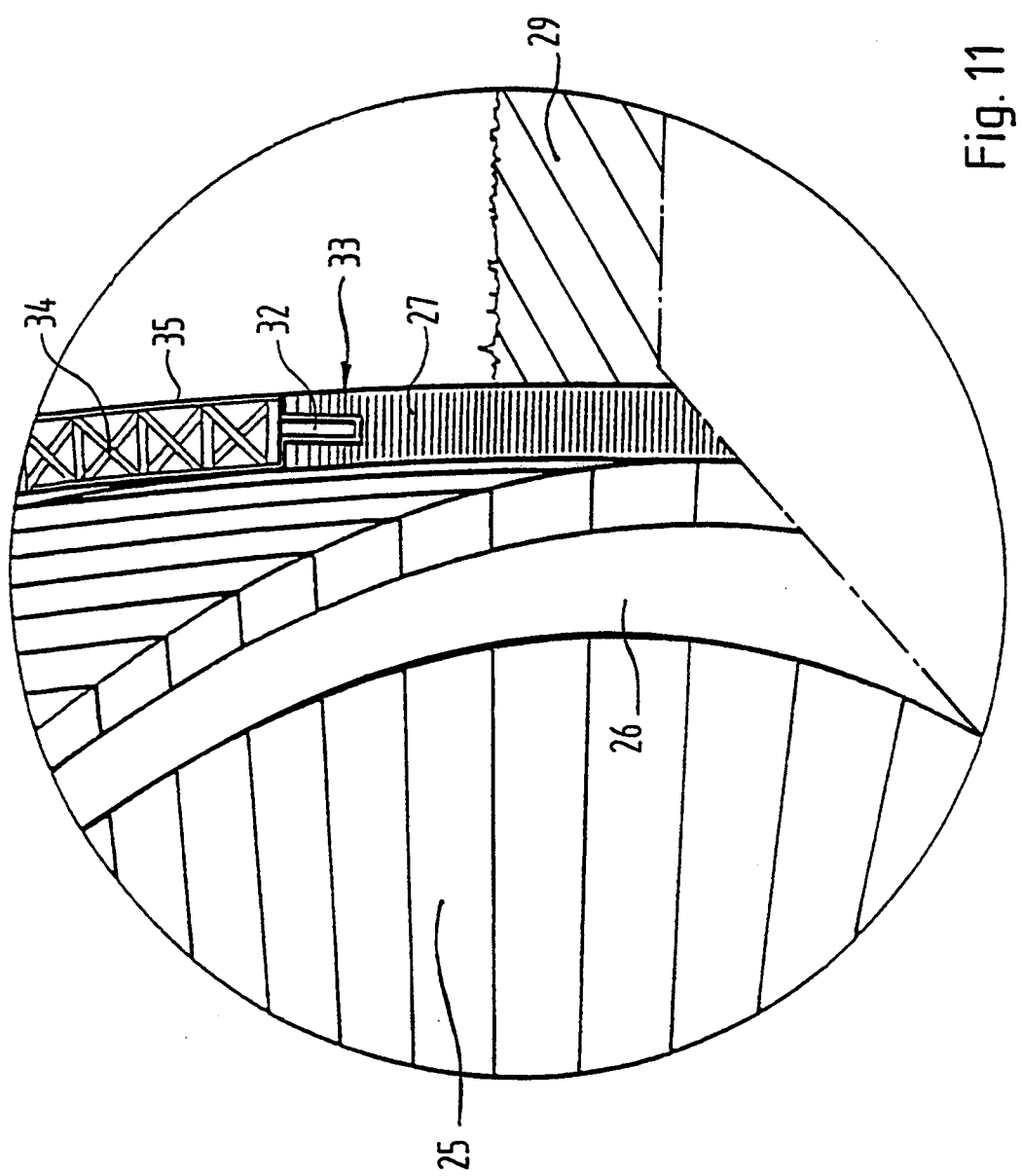

As specifically shown in FIGS. 10 and 11, the concrete wall 27 is separated from the concrete ring 25 by strong hard rubber-elastic buffers 26 which are disposed in annulus form. The numeral 29 designates the ground outside of the whole installation.

The dome structure 28 comprises a framework 34 as well as an outer enclosure 35. Guidance of the concrete wall 27 is effected via a bearing base 33 formed in the front end of the concrete wall 27 and engaged by a hollow body 32 disposed at the dome structure 28. The hollow body 32 and the bearing base 33 cooperate hydraulically or pneumatically in such a way that the dome structure 28, when inoperative, rests firmly on the front end of the concrete wall 27. When the dome structure 28 is to carry out rotational motion, the bearing is pressurized hydraulically or pneumatically so that low-friction rotary motion can take place.

Additionally, an inner platform is arranged in the interior of the circular cylinders 10, 13 and is constantly oriented horizontally and supported to suffer only little vibration. It extends so far into the interior of the reflector support system 12 that the instruments and appliances needed for the Nasmith focus can be mounted on it in a manipulation-friendly way.

What is claimed is:

1. A supporting apparatus for an astronomical instrument and comprising
   an elongate casing (12) adapted for supporting the reflectors (5,7) of the astronomical instrument, said casing having opposite ends and a pair of coaxial support cylinders (10,13) positioned at respective ones of said ends and so as to define an axis of elevation (120),
   a circular tray (22) supporting said casing hydrostatically thereupon for rotation about said axis of elevation,
   means mounting said tray hydrostatically upon a stationary bed and such that said tray is rotatable in a horizontal plane,
   a support ring (24) disposed concentrically about said tray, said support ring having a pair of bushings (20) rotatably supporting respective ones of said pair of support cylinders of said casing,
   means supporting said support ring hydrostatically for rotation in said horizontal plane, and
   drive means for rotating said tray and said support ring in said horizontal plane.

2. The supporting apparatus as defined in claim 1 wherein said drive means comprises first drive means for rotating said tray, and second drive means for independently rotating said support ring, and means electronically coupling said first and second drive means such that the movement of said ring serves as a reference for controlling the angular velocity of said tray.

3. The supporting apparatus as defined in claim 1 further comprising a pair of primary mirrors (5,7) supported within said casing.

4. The supporting apparatus as defined in claim 3 wherein said casing includes two apertures (16,17) disposed in a side by side arrangement for admitting a light beam onto each of said reflectors.

5. The supporting apparatus as defined in claim 1 wherein said casing further comprises an annular shell (11) mounted at a medial location along its length and so as to be coaxial with said support cylinders and said axis of elongation, and wherein said tray includes an arcuate channel which partially receives and guidingly supports said annular shell therein during rotation of said casing about said axis of elevation.

6. The supporting apparatus as defined in claim 5 further comprising casing drive means (30) cooperating with said annular shell for rotating said casing about said axis of elevation.

7. The supporting apparatus as defined in claim 6 wherein said casing drive means comprises at least one annular gear (31) fixed coaxially upon said annular shell, and a drive motor mounted to said tray and having a drive wheel (127) engaging said one annular gear.

8. The supporting apparatus as defined in claim 1 further comprising a stationary annular wall (23) positioned between said stationary bed for said tray and said support ring.

9. The supporting apparatus as defined in claim 1 further comprising
   a dome structure, and
   means supporting said dome structure so as to overlie said casing, said tray, and said support ring, said dome structure supporting means including a stationary concrete ring (27), and means hydrostatically supporting said dome structure on said stationary concrete ring for rotation in a horizontal plane.

10. The supporting apparatus as defined in claim 9 wherein said done structure supporting means further comprises a stationary foundation (25), and at least one buffer (26) disposed between said stationary foundation and said concrete ring.

11. The supporting apparatus as defined in claim 10 wherein said means hydrostatically supporting said dome structure on said stationary concrete ring comprises a bearing base (33) interposed between said concrete ring and said dome structure, and means for selectively pressurizing said bearing base with a fluid to permit low friction rotary motion therebetween.

* * * * *